United States Patent [19]

DeAmicis

[11] 4,433,671
[45] Feb. 28, 1984

[54] PORTABLE COOKING IMPLEMENT

[76] Inventor: Ferdinando DeAmicis, 9560 John Street Rd., Thunder Bay, Ontario, Canada

[21] Appl. No.: 375,354

[22] Filed: May 6, 1982

[51] Int. Cl.³ .............................................. F24C 1/16
[52] U.S. Cl. .................................. 126/9 R; 126/25 A
[58] Field of Search ..................... 126/9 R, 9 B, 25 R, 126/25 A

[56] References Cited

U.S. PATENT DOCUMENTS

| 1,499,665 | 7/1924 | Kaufman | 126/9 R |
| 2,959,165 | 11/1960 | Mark | 126/9 R |
| 3,422,746 | 1/1969 | Sheinker | 99/446 |

FOREIGN PATENT DOCUMENTS 4984 11/1926 Australia ................................. 126/9

Primary Examiner—Carroll B. Dority, Jr.
Attorney, Agent, or Firm—Peterson, Palmatier, Sturm, Sjoquist & Baker, Ltd.

[57] ABSTRACT

A lightweight, foldable, portable cooking implement having adjustable cooking and fire box work frames. A vertical frame is provided with a lower ground engaging end and a plurality of vertically spaced apart, forwardly opening, receptacles for removably engaging cooking and fire box frames. Lateral stabilizers, having lower ground engaging ends, are rotatably attached to each side of the vertical frame for adjustable disposition forwardly thereof.

8 Claims, 8 Drawing Figures

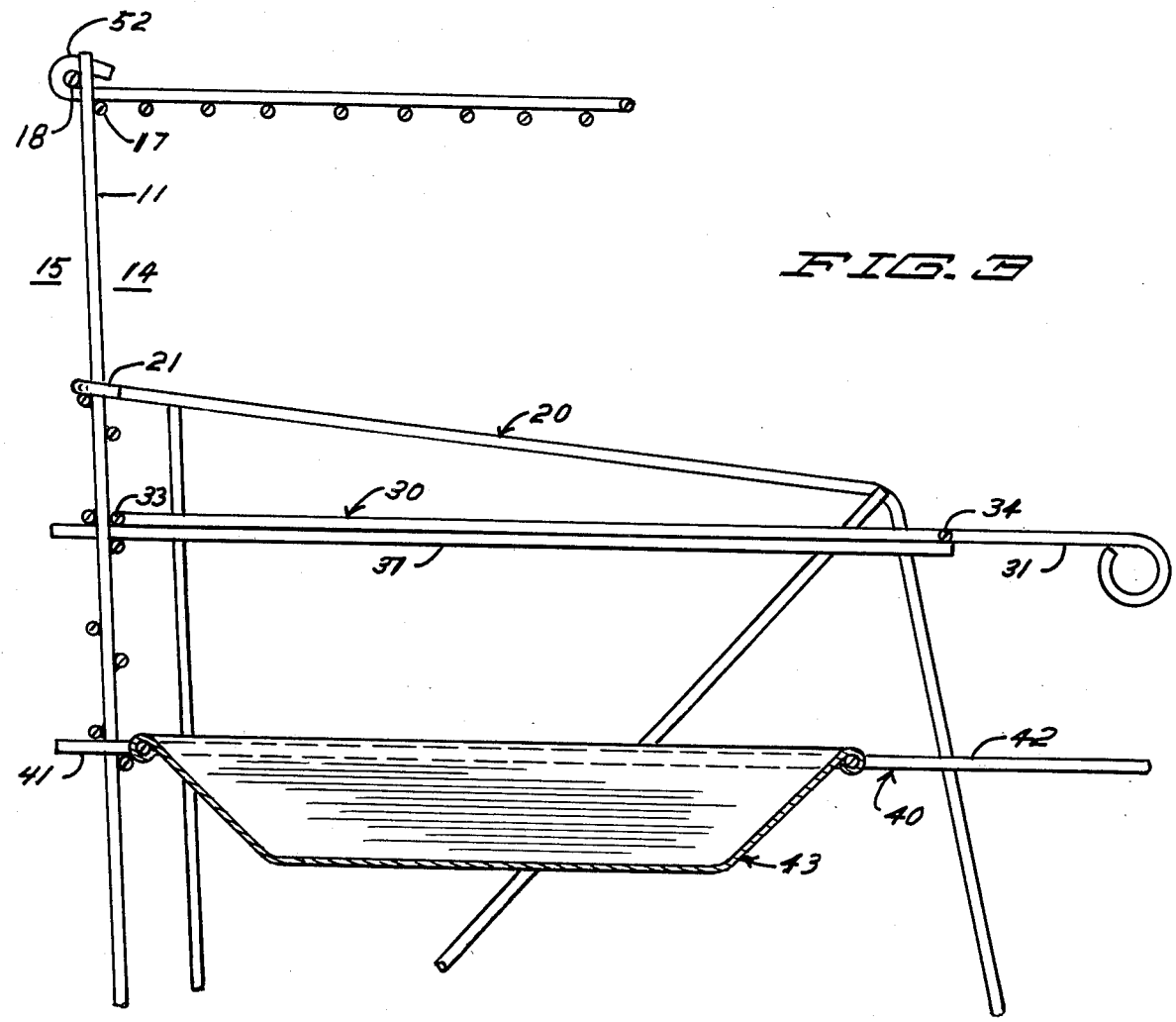
FIG. 3
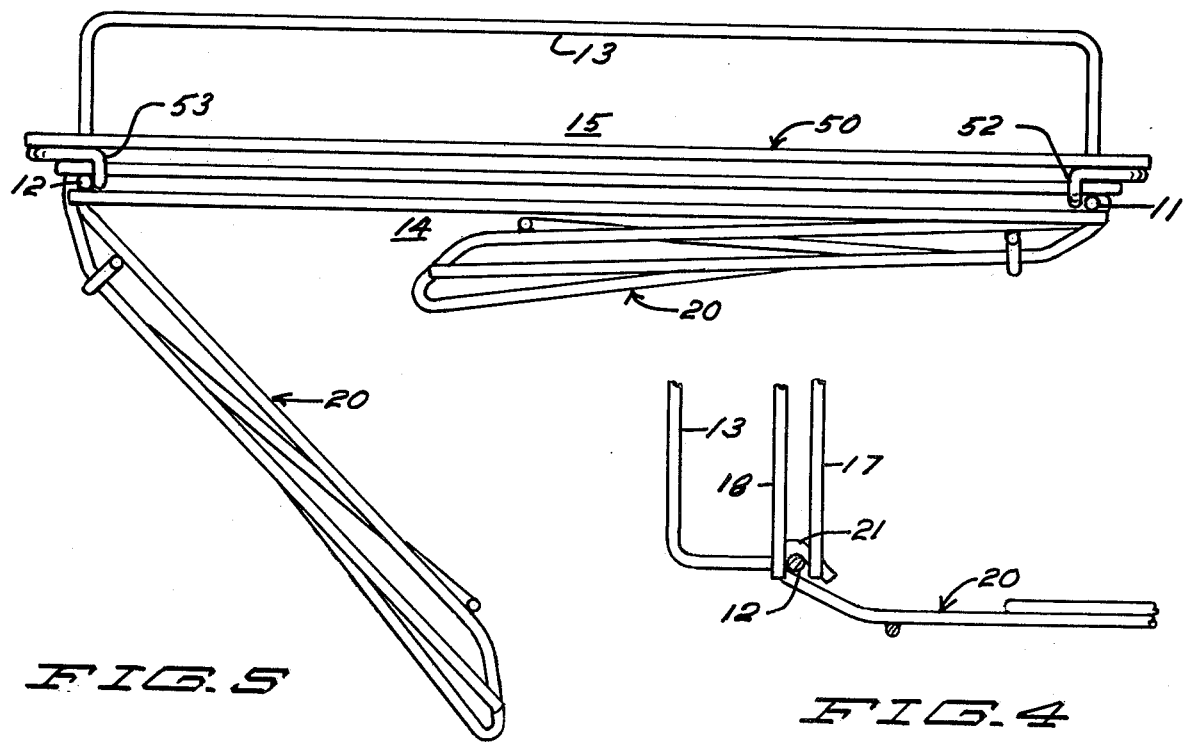
FIG. 5
FIG. 4

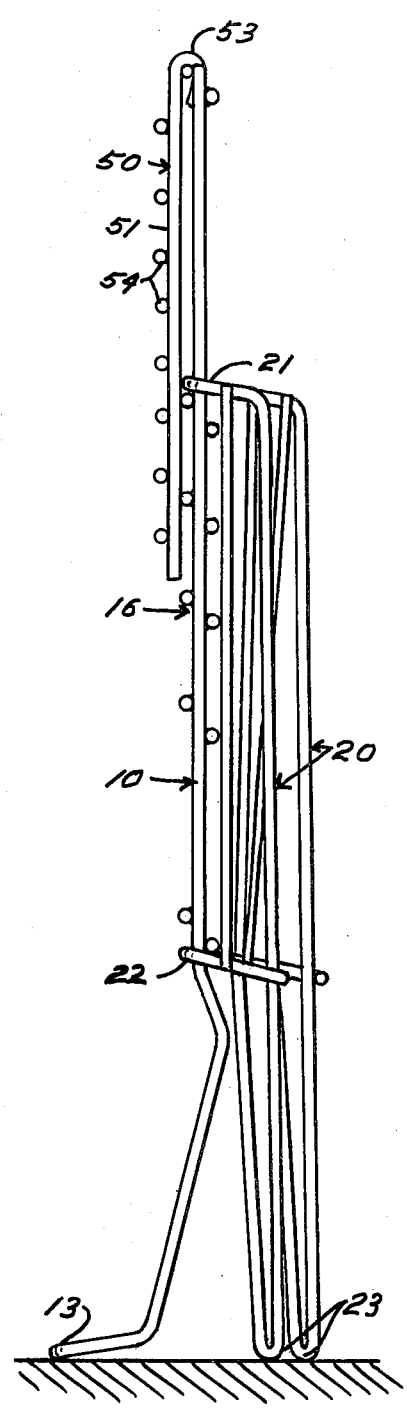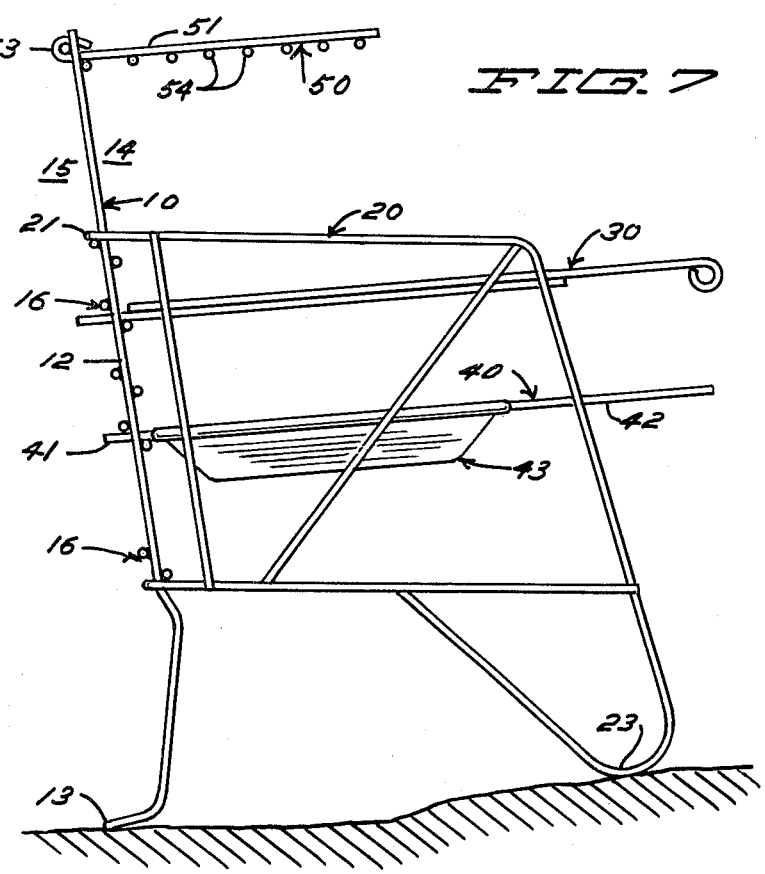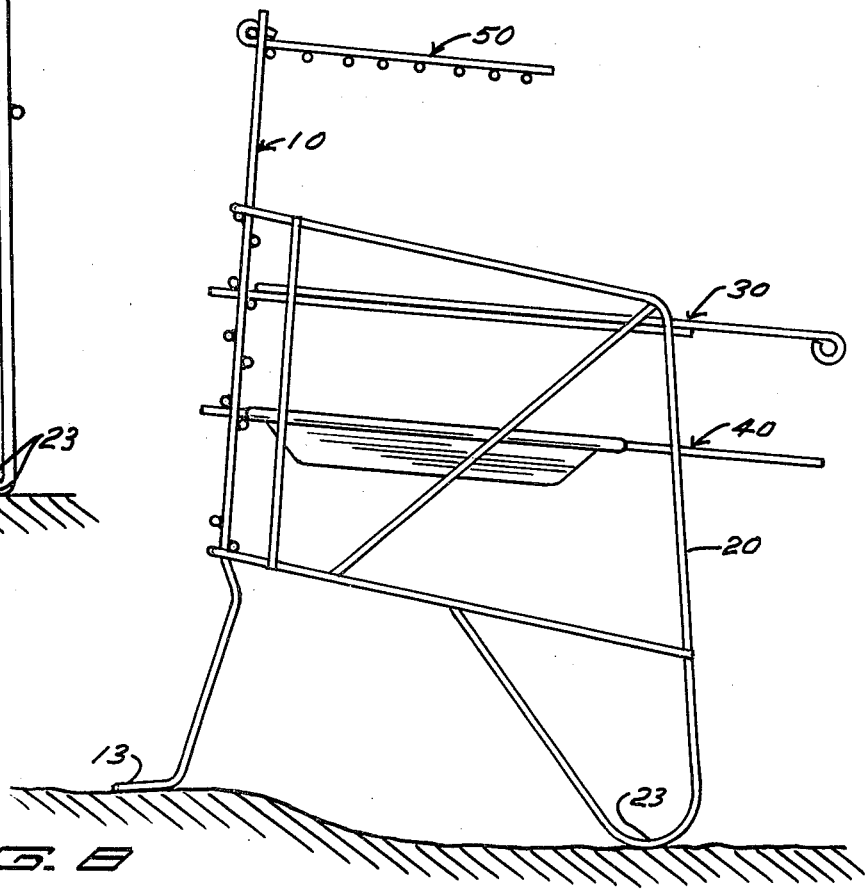

PORTABLE COOKING IMPLEMENT

FIELD OF THE INVENTION

This invention relates to portable cooking implements and is more particularily directed to lightweight foldable portable cooking implements which provide for adjustable disposition of work frames for cooking, and a source of heat.

BACKGROUND OF THE INVENTION

The prior art is replete with various and sundry forms of cooking implements that are designed to be portable and which feature the use of wheels, removable legs and the like. Although one such form of portable implement may feature a great deal of flexibility and another may feature east portability and still another may feature adaptability to varying conditions, such as an uneven ground surface, my invention provides an improved structure which includes all of these and other features as will become apparent from a consideration of the following specification and drawings.

SUMMARY OF THE INVENTION

My improved cooking implement is comprised of a vertically disposed main frame which includes a rearwardly extending ground engaging bottom portion and a plurality of work member receiving receptacles vertically spaced apart for removably receiving and engaging supporting elements of work frames extending forwardly therefrom. A stabilizer, having a ground engaging bottom portion, is rotatably disposed on each of the sides of the vertical main frame for rotatable disposition forwardly of the main frame to aid in maintaining the main frame in a vertical attitude. In a typical operational environment, a work frame in the form of a grill is disposed above a work frame in the form of a fire box and each are inserted into appropriately spaced receptacles on the main frame between the laterally disposed stabilizers. The lower ground engaging portion of the vertical main frame and the ground engaging bottom portions on each of the laterally disposed stabilizers form, in essence, a tripod support system and it may be seen that lateral disposition of the stabilizers to accommodate irregularities in the surface of the ground upon which the cooking implement is to be operated, may be easily accomplished to provide a substantially horizontal attitude for the forwardly extending work members.

DESCRIPTION OF THE DRAWINGS

FIG. 3 is an enlarged, fragmentary view of a portion of FIG. 1 with several of the elements shown in section;

FIG. 4 is an enlarged fragmentary sectional view taken along section 4—4 on FIG. 1;

FIG. 5 is an enlarged top plan view of the apparatus of FIGS. 1-5 with the elements shown in a semi-folded attitude;

FIG. 6 is an enlarged side elevational view of FIGS. 1-5 showing the elements in folded transporting disposition;

FIGS. 7 and 8 are side elevational views showing the relationship of the elements of my invention when disposed on a ground surface having substantial irregularities.

DESCRIPTION OF THE ILLUSTRATED EMBODIMENT

Figure 1:
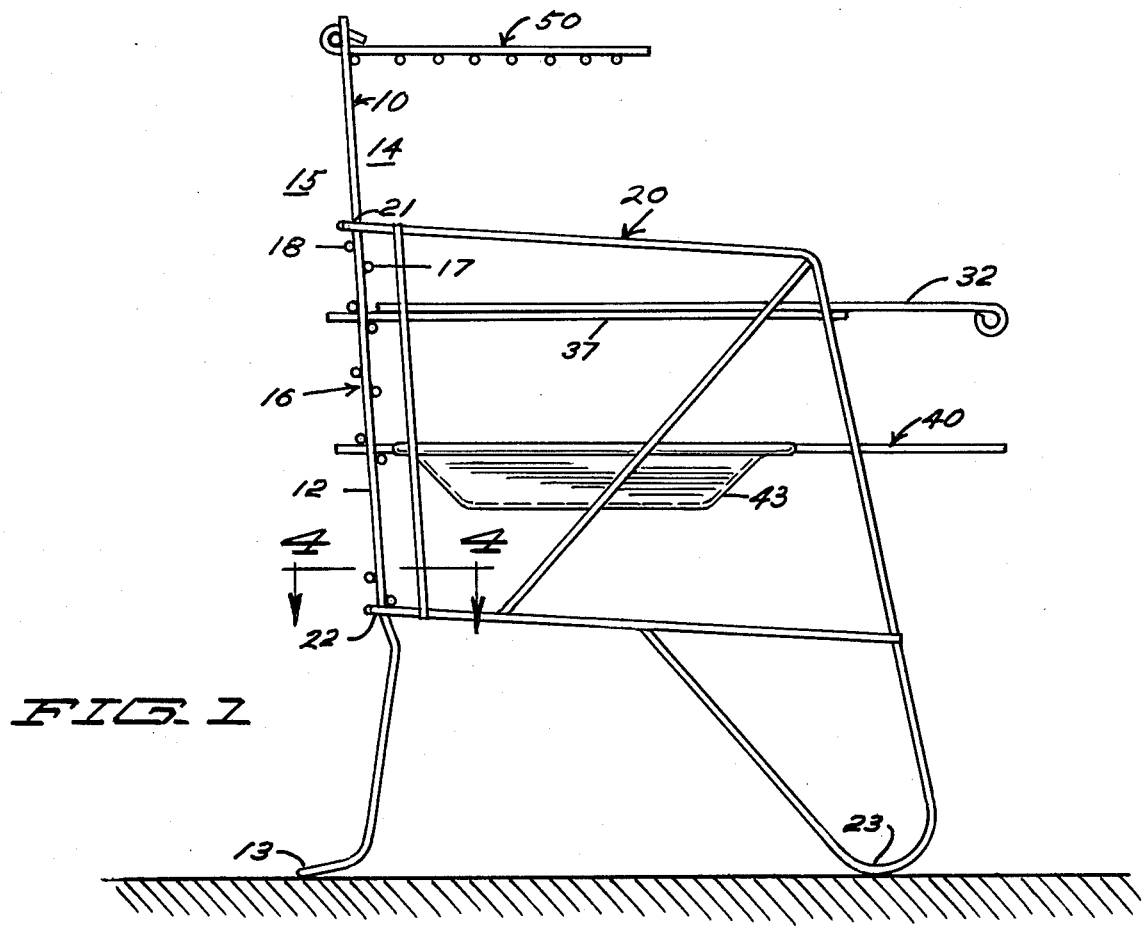
FIG. 1 is a side elevational view of the illustrative embodiment of my invention.

Referring to the drawings, my invention is shown embodying a U-shaped, vertically disposed main frame 10 having vertically extending side portions 11 and 12 and a rearwardly extending bottom ground engaging portion 13 at the lower closed end portion of the U-shape frame. The front and rear portions of main frame 10 are indicated generally by reference characters 14 and 15 respectively. A plurality of vertically spaced apart work frame supports, 16, include a generally horizontally extending lower front portion 17 and a similarily horizontally extending upper rear portion 18 to slideably engage and support a work frame, as set forth below.

A laterally adjustable stabilizer 20 is shown rotatably mounted on each of the side portions 11 and 12 of the main frame 10 for rotatable lateral disposition about the vertical axis of sides 11 and 12. Each side stabilizer 20 includes a top connector 21 and lower connector 22 as well as an outwardly disposed ground engaging lower portion 23.

A first work frame 30 is shown in a generally horizontal disposition and includes side portions 31 and 32, each having a forwardly extending handle portion, a rear portion 33 and front portion 34. A plurality of cylindrical rod like members 37 are disposed on the underside of work frame 30 to provide an open grill for receiving articles to be cooked. Work frame 30 may also be provided with a solid surface for use as a griddle or the like and, in either event, the sides of the work frame will be seen to provide a barrier around the periphery to tend to contain various articles to be cooked.

A further work frame is indicated generally by reference character 40 and is shown disposed in a generally horizontal position underneath work frame 30 and includes a rear support portion 41 and a forwardly extending handle 42, both rigidly connected to the rear and front portions of a fire box 43.

A further work frame, indicated generally by reference character 50, is shown rotatably disposed on the top of main frame 10 and includes a U-shaped frame portion 51, having connectors 52 and 53 at the open end, rotatably disposed on upper member 18 of a support 16 and plurality of rod members 54 are shown stationarily attached to the under portions of frame 51.

As may now be seen from a consideration of the several views of the drawings, my implement may be fabricated from lightweight, durable materials in a substantially "open" form of construction that materially contributes to the portability of my invention. As may further be seen from the drawings, the illustrated embodiment is comprised almost entirely of easily formed rod or wire material. Main frame 10 has a generally U-shaped configuration and is provided with work frame support 16 along its vertical dimension and is further provided with bottom ground engaging portion 13 at the lower closed end of its U-shape that extends rearwardly of the frame for additional stability. Stabilizers 20 and work frames 30, 40 and 50 may be fabricated of similar materials and fire box 43 may conveniently be formed of sheet or cast, lightweight material.

OPERATION OF THE ILLUSTRATED EMBODIMENT

Figure 2:
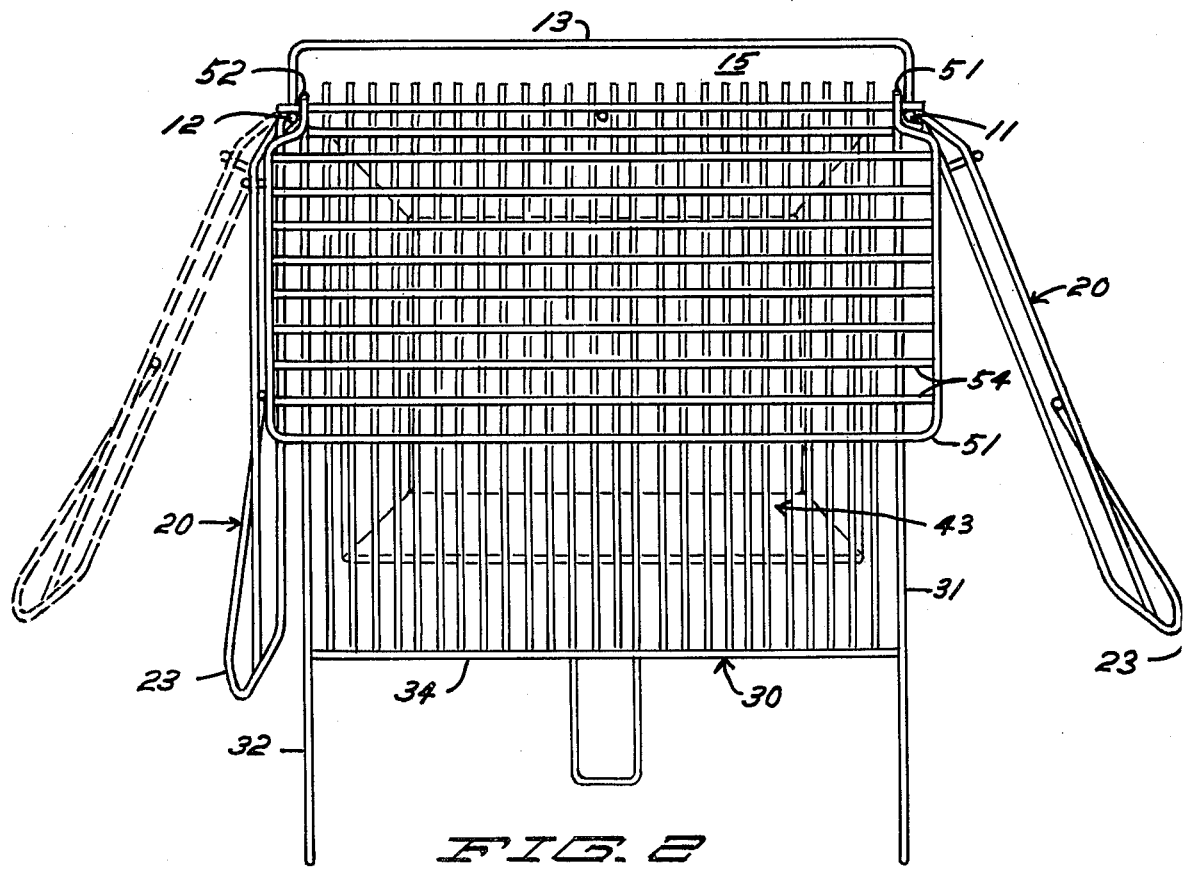
FIG. 2 is a top plan view of the embodiment shown in FIG. 1.

Referring to FIG. 6 of the drawings, the side elevational view of the completely folded transportable structure is shown in vertical disposition on a horizontal surface. Work frames 30 and 40 are held in readiness. As may be seen in the top plan view of FIG. 2, stabilizers 20 on each side of main frame 10 are rotated outwardly from the folded position to an extent sufficient to allow insertion of work frames 30 and 40 into supports 16 on main frame 10. The position of stabilizers 20 is dependant, to a large extent, on the nature of the terrain or surface of the ground and it is perferrable to dispose stabilizers 20 in a position that will maintain main frame 10 in a generally vertical position. Following this, work frames 30 and 40 are inserted into support 16 at the desired elevation, one with respect to the other, and to the surface of the ground, and they will be maintained in a substantial horizontal position in the cantilever connection with support 16. Frame 51 may be rotated about rear upper member 18 on the top most support 16 to assume a similar horizontal attitude.

I claim:

1. A folding portable cooking implement comprising, in combination;

frame means, to be disposed in a generally vertical plane, and including a lower ground engaging portion and a plurality of vertically spaced apart work frame support means spaced alternately on opposite sides of said frame means and adapted to removably receive and support a work frame;

a plurality of stabilizer means rotatably disposed on said frame means for rotation about a vertical axis in the plane of said frame means between folded positions adjacent said frame means and extended positions forwardly of said frame means and including ground engaging support means adjacent their lower outer portions and a plurality of work frames each being held between a pair of adjacent work frame support means to support said work frames in a generally horizontal position forwardly of said frame means.

2. The apparatus of claim 1 in which the frame means has a U-shaped configuration.

3. The apparatus of claim 2 in which the lower ground engaging portion of the frame means extends rearwardly therefrom.

4. The apparatus of claim 2 in which the work frame support means include a pair of longitudinally elongated members extending intermediate the sides of the frame means on the front and rear sides thereof.

5. The apparatus of claim 1 in which one of the work frames is comprised of a rectangular frame and a plurality of work support members extending intermediate the lower opposite sides thereof.

6. The apparatus of claim 1 in which the frame means has an inverted U-shaped configuration.

7. The apparatus of claim 6 in which the lower ground engaging portion of the frame means extends rearwardly therefrom.

8. The apparatus of claim 6 in which the work frame support means include a pair of longitudinally elongated members extending intermediate the sides of the frame means on the front and rear sides thereof.

* * * * *